(12) United States Patent
Asada

(10) Patent No.: US 6,808,315 B2
(45) Date of Patent: Oct. 26, 2004

(54) OPTICAL CONNECTOR INTEGRALLY FORMED SO AS TO LIMIT THE BEND RADIUS OF AN OPTICAL FIBER CORD

(75) Inventor: Kazuhiro Asada, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/293,559

(22) Filed: Nov. 14, 2002

(65) Prior Publication Data

US 2003/0133672 A1 Jul. 17, 2003

(30) Foreign Application Priority Data

Nov. 14, 2001 (JP) ........................................ 2001-348351

(51) Int. Cl.[7] ................................................. G02B 6/36
(52) U.S. Cl. .......................................... 385/86; 385/77
(58) Field of Search ............................. 385/87, 77, 86, 385/59, 55

(56) References Cited

U.S. PATENT DOCUMENTS 5,245,683 A * 9/1993 Belenkiy et al. .............. 385/72
5,530,787 A * 6/1996 Arnett .......................... 385/137
5,748,821 A * 5/1998 Schempp et al. ............. 385/76
6,130,983 A * 10/2000 Cheng .......................... 385/139
6,461,052 B1 * 10/2002 Hines et al. ................... 385/53
6,496,642 B2 * 12/2002 Gonzalez et al. ............ 385/136
2001/0043775 A1 * 11/2001 Shirakawa et al. ........... 385/59
2003/0007744 A1 * 1/2003 Ngo ............................. 385/86

FOREIGN PATENT DOCUMENTS

JP          A 10-78534        3/1998

* cited by examiner

Primary Examiner—Hae Moon Hyeon
(74) Attorney, Agent, or Firm—Oliff & Berridge, PLC

(57) ABSTRACT

An optical connector in which the operation for inserting an optical fiber cord can be effected easily, and the optical fiber cord can be positively prevented from being abruptly bent. A bending guide portion of an arcuate shape is formed integrally with a housing body portion for receiving and holding an end portion of an optical fiber cord. The bending guide portion has a generally tubular shape, and its inner peripheral portion forms an inner peripheral bending limitation portion for limiting a minimum value of a bend radius of the optical fiber cord, while its outer peripheral side is open over an entire length thereof in a peripheral direction thereof. In place of the outer peripheral side, one side and the other side of the bending guide portion may be open over an entire length thereof in a peripheral direction thereof.

14 Claims, 6 Drawing Sheets

OPTICAL CONNECTOR INTEGRALLY FORMED SO AS TO LIMIT THE BEND RADIUS OF AN OPTICAL FIBER CORD

BACKGROUND OF THE INVENTION

1. Field of the Invention

This invention relates to an optical connector for connecting an optical fiber and a light-receiving element or a light-emitting element together or for connecting optical fibers together in an automobile, an equipment or the like.

2. Background Art

For installing an optical fiber cord, for example, within an automobile, there are occasions when this installation must be effected in such a manner that the optical fiber cord, extending outwardly from an optical connector, is bent immediately after the optical connector because of an installation space or others.

When the optical fiber is abruptly bent, a light loss much increases.

Therefore, in a conventional construction, a rubber boot, bent into a predetermined bend radius, is attached to a rear side of an optical connector. An optical fiber cord is passed through the rubber boot, and is extended to the exterior so that the optical fiber cord will not be abruptly bent.

Here, the optical connector and the rubber boot are separate from each other in order that the rubber boot can be afterward attached to the optical connector after the optical fiber cord is inserted and held in the optical connector, and by doing so, the operation for inserting the optical fiber cord in the optical connector can be effected easily.

In the conventional construction, however, there has been a fear that the optical connector and the rubber boot become disengaged from each other during the use or in other cases since the two are separate from each other, and in this case there has been a fear that the optical fiber cord is abruptly bent.

And besides, the optical connector and the rubber boot are separate from each other, and therefore the number of the component parts increases, and the operation for combining them together is needed, which has invited a problem that the efficiency of the assembling operation is low.

SUMMARY OF THE INVENTION

It is therefore an object of this invention to provide an optical connector in which the operation for inserting an optical fiber cord can be effected easily, and the optical fiber cord can be positively prevented from being abruptly bent, and besides the number of the component parts can be reduced, and furthermore an excellent assembling efficiency can be achieved.

The above problems have been solved by an optical connector of the present invention which comprising a housing body portion for receiving and holding an end portion of an optical fiber cord, the housing body portion being adapted to be connected to a mating optical connector; and a bending guide portion of a generally arcuate shape which is formed integrally with the housing body portion, and can receive the optical fiber cord; wherein the bending guide portion has an inner peripheral bending limitation portion for contacting an inner peripheral portion of the optical fiber cord in a bent condition to limit a minimum value of a bend radius of the optical fiber cord, and at least part of the bending guide portion except the inner peripheral bending limitation portion is open.

According to the invention, an outer peripheral side of the bending guide portion may be open at least on a line of extension of a direction of inserting of the optical fiber cord in the housing body portion.

According to the invention, there may be adopted a construction in which the outer peripheral side of the bending guide portion is open on the line of extension of a direction of inserting of the optical fiber cord in the housing body portion, and is closed at a distal end portion of the bending guide portion.

According to the invention, there may be adopted a construction in which one of the outer peripheral side, one side and the other side of the bending guide portion is open over an entire length thereof in a peripheral direction thereof, and a holder member for holding the optical fiber cord in the bending guide portion is mounted at the distal end portion of the bending guide portion.

DETAILED DESCRIPTION OF THE PREFERRED EMBODIMENTS

Figure 1:
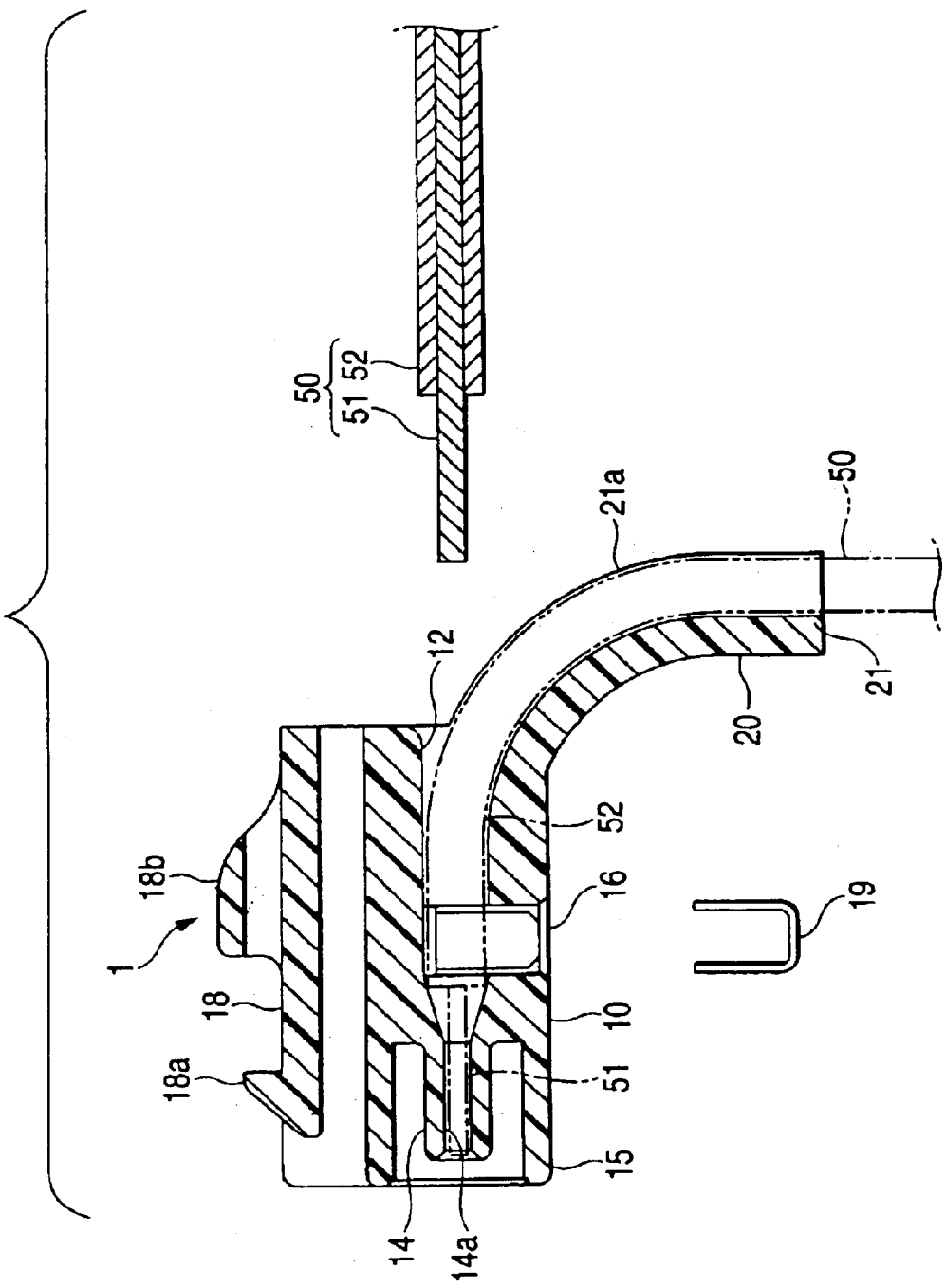
FIG. 1 is a cross-sectional view showing a preferred embodiment of an optical connector of the present invention and an optical fiber cord to be inserted and held therein.
Figure 2:
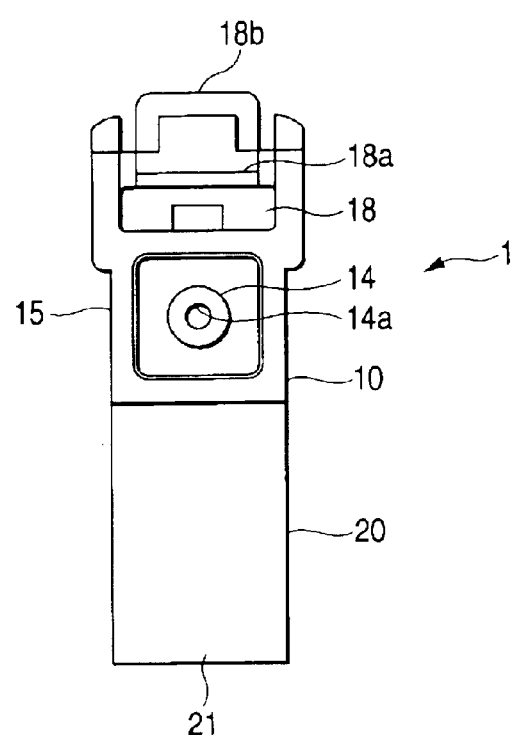
FIG. 2 is a front-elevational view showing the optical connector.
Figure 3:
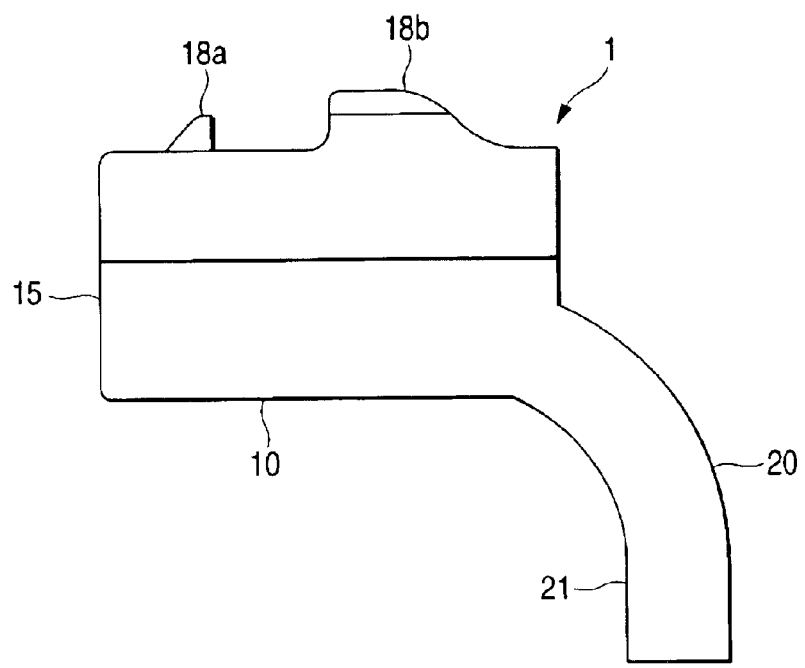
FIG. 3 is a side-elevational view showing the optical connector.
Figure 4:
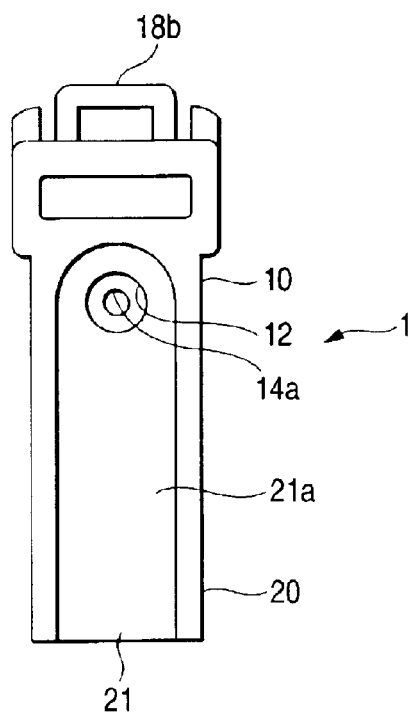
FIG. 4 is a rear view showing the optical connector.
Figure 5:
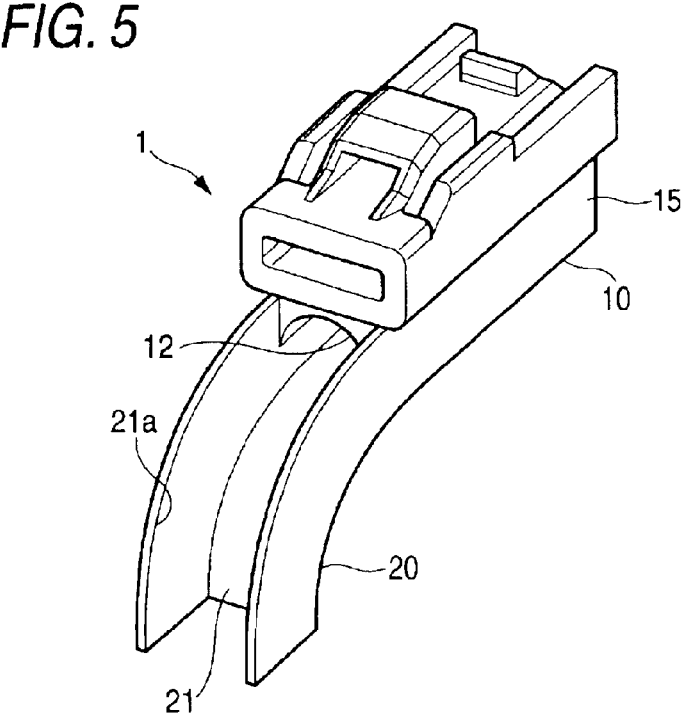
FIG. 5 is a perspective view showing the optical connector.

A preferred embodiment of an optical connector of the present invention will now be described.

As shown in FIGS. 1 to 5, this optical connector 1 holds an end portion of an optical fiber cord 50, and is adapted to be connected to a mating optical connector (not shown) holding an optical fiber cord, a light-receiving element or a light-emitting element, and this optical connector 1 includes a housing body portion 10, and a bending guide portion 20.

The optical fiber cord 50 comprises an optical fiber 51 (having a cladding formed around a core to cover the same), and a sheath 52 (made of a resin or the like) formed on an outer periphery of the optical fiber 51. When the optical fiber cord is to be inserted and held in the optical connector 1, the sheath 52 is beforehand removed from the end portion of the optical fiber cord, so that the optical fiber 51 is exposed over a predetermined length.

The housing body portion 10 is so constructed as to receive and hold the end portion of the optical fiber cord 50, and can be connected to the mating optical connector.

More specifically, the housing body portion 10 is made of a resin or the like, and is formed into a generally tubular shape, and a cord insertion hole portion 12 for receiving and holding the optical fiber cord 50 in an axial direction thereof is formed in this housing body portion.

A ferrule portion 14 of a generally cylindrical tubular shape is formed integrally at a front end portion of the housing body portion 10, and projects toward the front end of the housing body portion. A fiber insertion hole portion 14a for receiving the optical fiber 51 is formed in the ferrule portion 14.

The fiber insertion hole portion 14a is disposed in alignment with the cord insertion hole portion 12, and is in communication therewith. When the optical fiber cord 50 is inserted into the cord insertion hole portion 12 from the rear side, the optical fiber 51, projecting at the distal end of the optical fiber cord 50, is inserted and held in the fiber insertion hole portion 14a.

At the distal end of the ferrule portion 14, the end surface of the optical fiber 51 is processed into a specular surface. When the optical connector 1 is connected to the mating optical connector, the ferrule portion 14 is inserted into a ferrule guide hole in the mating optical connector, so that the end surface of the optical fiber 51 is disposed in opposed relation to an end surface of the mating optical fiber, a light-receiving surface of the light-receiving element or a light-emitting surface of the light-emitting element.

With the following construction, the optical fiber cord 50 is inserted and held in a predetermined position within the housing body portion 10.

Namely, as shown in FIG. 1, an opening 16 is formed in a central portion of a bottom portion of the housing body portion 10, and a stopper 19 is inserted into the cord insertion hole portion 12 through this opening 16, and is held in a predetermined position in this cord insertion hole portion 12.

The stopper 19 is formed, for example, by pressing a thin plate-like member made of metal or the like, and has positioning tooth (not shown) of a generally U-shape for biting engagement with the sheath 52 of the optical fiber cord 50. When the stopper 19 is received and held in the predetermined position in the cord insertion hole portion 12, the positioning tooth are engaged with the sheath 52, thereby positioning and holding the optical fiber cord 50 in the axial direction thereof.

The construction of positioning and fixing the optical fiber cord 50 is not limited to the above construction employing the stopper 19, and the optical fiber cord may be fixed, using, for example, an adhesive or the like.

As shown in FIGS. 1 to 5, a protective tubular portion 15 is formed at the front end portion of the housing body portion 10 in surrounding relation to the ferrule portion 14. The projective tubular portion 15 extends forwardly beyond the distal end of the ferrule portion 14, and serves to prevent an external member, the fingers of a person and others from contacting the end surface of the optical fiber 51 exposed at the distal end of the ferrule portion 14.

An engagement extension piece portion 18 is formed on the upper side of the housing body portion 10, and extends toward the rear and front ends of this housing body portion. When this optical connector 1 is connected to the mating optical connector, an engagement projection 18a, formed at a front end of the engagement extension piece portion 18, is engaged in an engagement recess (not shown) in the mating optical connector, thereby maintaining this connected condition. When an operating portion 18b, formed on an upper surface of the engagement extension piece portion 18, is pressed down, the above engaged condition is canceled, so that the connection of this optical connector to the mating optical connector can be canceled.

The bending guide portion 20 is formed integrally with the housing body portion 10, and is formed into such an arcuate shape as to receive the optical fiber cord 50. This bending guide portion 20 has an inner peripheral side-bending limitation portion 21 for contacting the inner peripheral side of the optical fiber cord 50 in a bent condition to limit a minimum value of a bend radius thereof, and at least part of the remainder is open.

In this embodiment, the bending guide portion 20 is in the form of a tubular member of a square cross-section capable of receiving the optical fiber cord 50, and this tubular member is curved into an arcuate shape having a central angle of about 90 degrees, and an inner peripheral portion of this curved tubular member defines the inner peripheral side-bending limitation portion 21, having a predetermined curvature radius, while an open portion 21a is formed in an outer peripheral side thereof over an entire length thereof in the peripheral direction. An internal space of the bending guide portion 20 is continuous with the rear end of the cord insertion hole portion 12, and the optical fiber cord 50, extending rearwardly from the cord insertion hole portion 12, can be received in the bending guide portion 20.

When the optical fiber cord 50 is received in the bending guide portion 20, the outer peripheral side of the inner peripheral side-bending limitation portion 21 is held in contact with the inner peripheral portion of the bent optical fiber cord 50, thereby limiting the minimum value of the bend radius of the optical fiber cord 50. In this case, preferably, the thus limited minimum value of the bend radius of the optical fiber cord 50 is larger than the minimum bend radius (which is determined in accordance with the kind of the optical fiber cord 50 and so on, and when the optical fiber cord is bent into a bend radius smaller than this minimum bend radius, a light loss increases greatly.) of the optical fiber cord 50. Therefore, preferably, the radius of curvature of the inner peripheral side-bending limitation portion 21 is larger than the minimum bend radius of the optical fiber cord 50.

In this embodiment, the outer peripheral side of the bending guide portion 20 is open, and therefore the maximum value of the bend radius of the optical fiber cord 50 is not limited.

The procedure of holding the optical fiber cord 50 in the optical connector 1 of the above construction will be described.

First, the end portion of the optical fiber cord 50 is inserted into the cord insertion hole portion 12 in the housing body portion 10 from the rear side thereof. At this time, the optical fiber cord 50 can be inserted into the cord insertion hole portion 12 through the open portion 21a since this open portion 21a is formed in the outer peripheral side of the bending guide portion 20.

Then, the optical fiber 51 at the end portion of the optical fiber cord is inserted into the fiber insertion hole portion 14a while the end portion of the sheath 52 of the optical fiber cord 50, disposed adjacent to the exposed optical fiber, is inserted in the cord insertion hole portion 12. In this condition, when the stopper 19 is inserted into the cord insertion hole portion 12 through the opening 16, and is held in the predetermined position in this cord insertion hole portion 12, the optical fiber cord 50 is positioned and held in the axial direction.

Finally, the optical fiber cord 50, extending rearwardly from the housing body portion 10, is bent to extend along the outer peripheral surface of the inner peripheral side-bending limitation portion 21, and is received in the bending guide portion 20, and is thus extended from the side of the housing body portion 10 (see chain double-dashed lines in FIG. 1).

In this manner, the operation for holding the optical fiber cord 50 is finished.

In the optical connector 1 of the above construction, since the housing body portion 10 and the bending guide portion 20 are formed integrally with each other, the two are prevented from being disengaged from each other, and therefore the optical fiber cord 50 is more positively prevented from being abruptly bent.

And besides, the open portion 21a is formed in at least part of the bending guide portion 20 except the inner peripheral side-bending limitation portion 21, and therefore the operation for inserting the optical fiber cord 50 can be easily effected, utilizing the open portion 21a.

In this embodiment, although the open portion 21a is formed in the outer peripheral side of the bending guide portion 20 over the entire length thereof in the peripheral direction, this is not always necessary.

Figure 6:
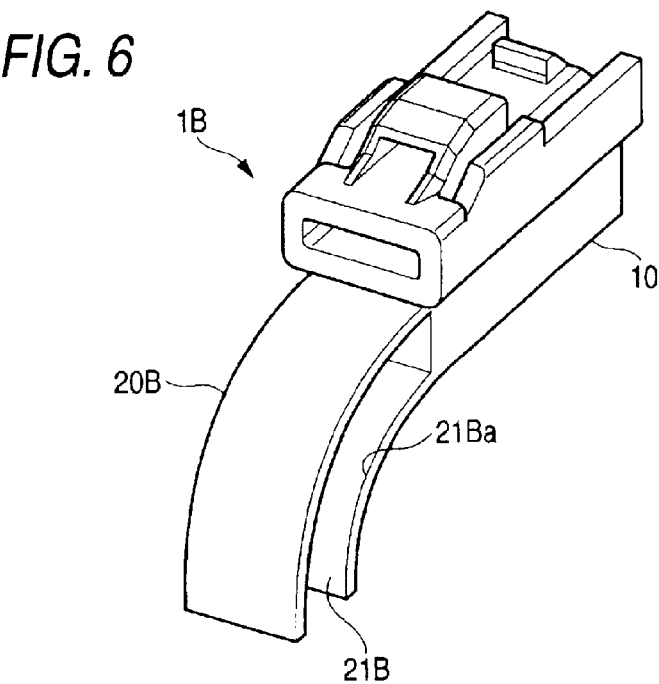
FIG. 6 is a perspective view showing a modified optical connector (modified example 1).

For example, FIG. 6 shows a modified optical connector 1B (modified example 1) in which an inner peripheral portion of a bending guide portion 20B, comprising a tubular body curved into an arcuate shape, defines an inner peripheral side-bending limitation portion 21B similar to the inner peripheral side-bending limitation portion 21, and an open portion 21Ba is formed in one side of this bending guide portion over an entire length thereof in a peripheral direction.

In short, in so far as the open portion 21a, 21Ba is formed in at least part of the bending guide portion 20, 20B except the inner peripheral side-bending limitation portion 21, 21B, the optical fiber cord-inserting operation can be effected easily, utilizing the open portion 21a, 21Ba.

However, in the case where the outer peripheral side of the bending guide portion 20 is open at least on a line of extension of the direction of inserting of the optical fiber cord 50 in the housing body portion 10, that is to say, the open portion 21a is formed immediately after the cord insertion hole portion 12 of the housing body portion 10, the operation for inserting the optical fiber cord 50 into the cord insertion hole portion 12 can be effected more smoothly.

Since the housing body portion 10 and the bending guide portion 20 are formed integrally with each other, the number of the component parts is reduced, and besides the operation for combining them together is not necessary, and therefore the assembling efficiency is excellent.

And besides, the outer peripheral side of the bending guide portion 20 is open over the entire area thereof, and therefore a compact-size design of the bending guide portion 20 and hence a compact-size design of the optical connector 1 can be achieved.

Figure 7:
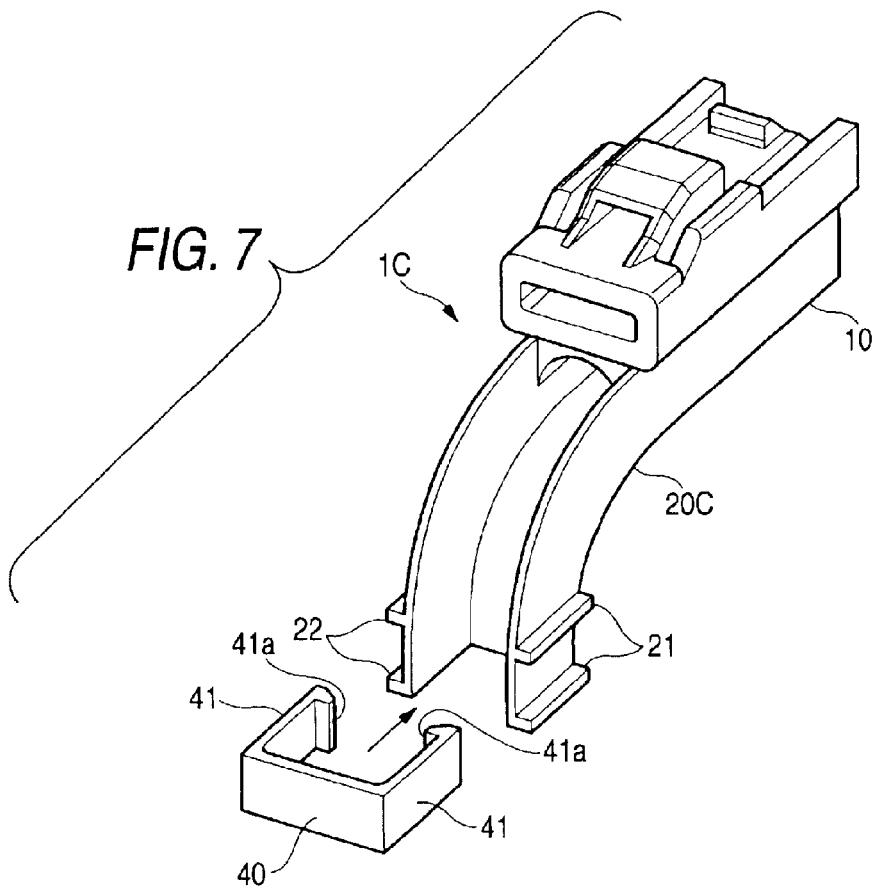
FIG. 7 is a perspective view showing a modified optical connector (modified example 2).

FIG. 7 shows a modified optical connector 1C (modified example 2) in which one of an outer peripheral side, one side and the other side of a bending guide portion 20C (here, the outer peripheral side of the bending guide portion 20C as shown in FIG. 7) is open over an entire length thereof in a peripheral direction, and a holder member 40 for holding the optical fiber cord 50 in the bending guide portion 20C is attached to a distal end portion of the bending guide portion 20C.

More specifically, the holder member 40 is in the form of a generally U-shaped member which can be fitted on the distal end portion of the bending guide portion 20C from the outer peripheral side to generally embrace it, and inwardly-projecting engagement projections 41a are formed respectively at distal ends of opposed side piece portions 41 of this holder member. A pair of guide ridges 22 for guiding the corresponding side piece portion 41 are formed on an outer surface of each of the opposite side walls of the bending guide portion 20C at the distal end portion thereof. Each of the opposed side piece portions 41 of the holder member 40 is pushed to be inserted into a space between the corresponding guide ridges 22, and the engagement projections 41a are brought into engagement with opposite side edges of the inner peripheral portion of the bending guide portion 20C, respectively, so that the holder member 40 is attached to the distal end portion of the bending guide portion 20C in a retained manner.

In this optical connector 1C, first, the holder member 40 is not attached to this connector, and in this condition the optical fiber cord 50 can be inserted into the optical connector 1C, and then can be received in the bending guide portion 20C, and these operations can be sequentially effected easily.

After this operation, the holder member 40 is attached to the bending guide portion 20C, and by doing so, the optical fiber cord 50 can be more positively pressed into the bending guide portion 20C to be held therein, and the optical fiber cord 50 is prevented from being disengaged from the bending guide portion 20C.

Figure 8:
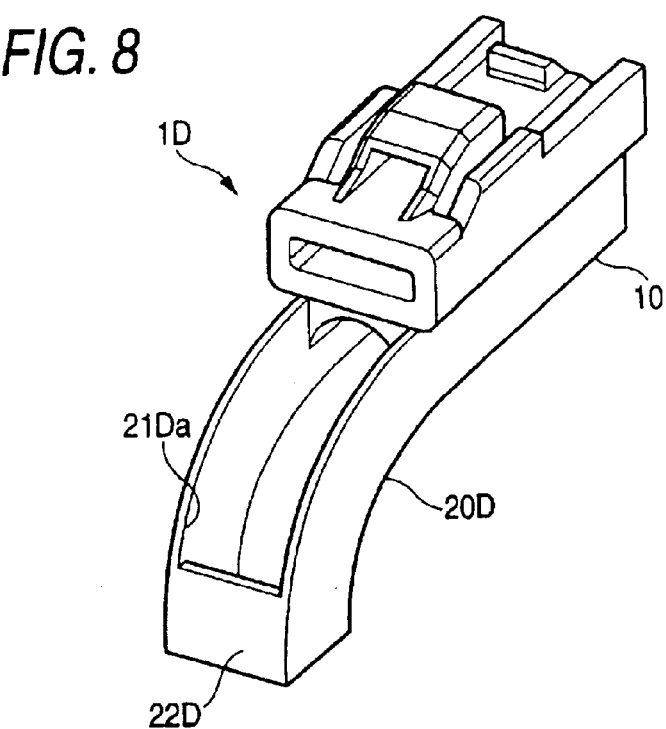
FIG. 8 is a perspective view showing a modified optical connector (modified example 3).

FIG. 8 shows a modified optical connector 1D (modified example 3) in which an outer peripheral side of a bending guide portion 20D has an open portion 21Da which is open on a line of extension of the direction of inserting of the optical fiber cord 50 in a housing body portion 10, and this open portion is closed at a distal end portion of the bending guide portion 20D by a closure portion 22D. In contrast with the modified example 2, the closure portion 22D is formed integrally with the bending guide portion 20D.

In this case, the operation for inserting and holding the optical fiber cord 50 in the optical connector 1D can be effected in the following manner.

Figure 9:
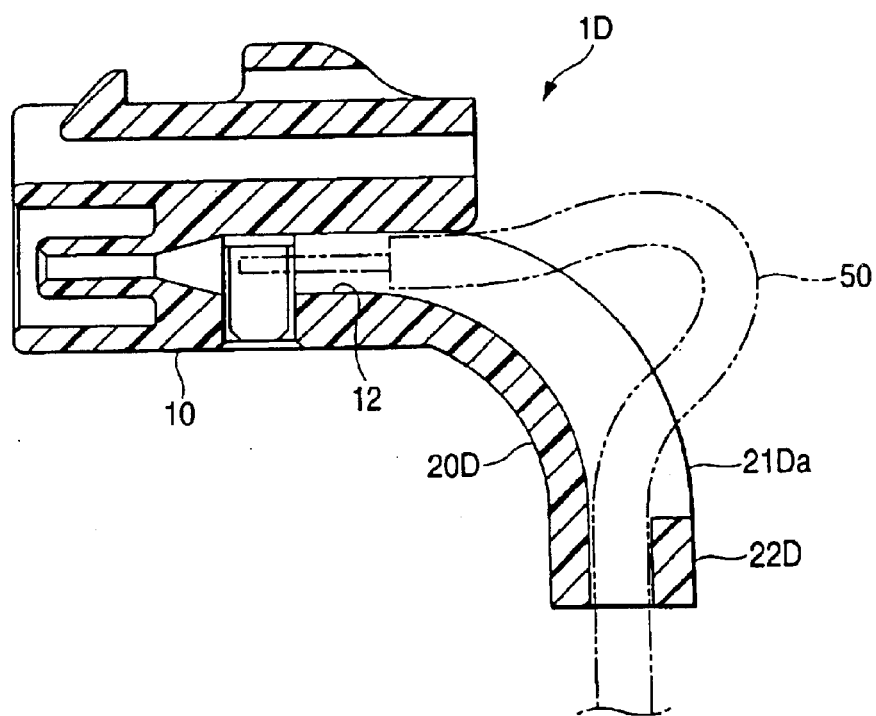
FIG. 9 is a cross-sectional view showing the procedure of inserting and holding an optical fiber cord in the optical connector of the modified example 3.

Namely, the optical fiber cord 50 is inserted into the bending guide portion 20D through an open end thereof (lower end in FIG. 9), and is passed through this bending guide portion, and the optical fiber cord is once extended outwardly from the bending guide portion via the open portion 21Da, as shown in FIG. 9.

Then, the end portion of the optical fiber cord 50 is inserted into a cord insertion hole portion 12 through the open portion 21Da, thereby positioning and holding the optical fiber cord (see dots-and-dash lines in FIG. 9).

Finally, when that portion of the optical fiber cord 50, extending outwardly (downwardly) from the distal end of the bending guide portion 20D, is pulled, that portion of the optical fiber cord 50, disposed outwardly of the open portion 21Da, is received in the bending guide portion 20D, thus finishing the inserting and holding operation.

In this optical connector 1D, the bending guide portion 20D is open on the line of extension of the direction of inserting of the optical fiber cord 50 in the housing body portion 10, and therefore the operation for inserting the optical fiber cord 50 into the housing body portion 10 can be effected easily.

And besides, the outer peripheral side of the bending guide portion 20D is closed at the distal end portion thereof, and therefore by inserting the optical fiber cord 50 through the distal end portion of the bending guide portion 20D, the optical fiber cord 50 can be prevented from being disengaged from the bending guide portion 20D.

Figure 10:
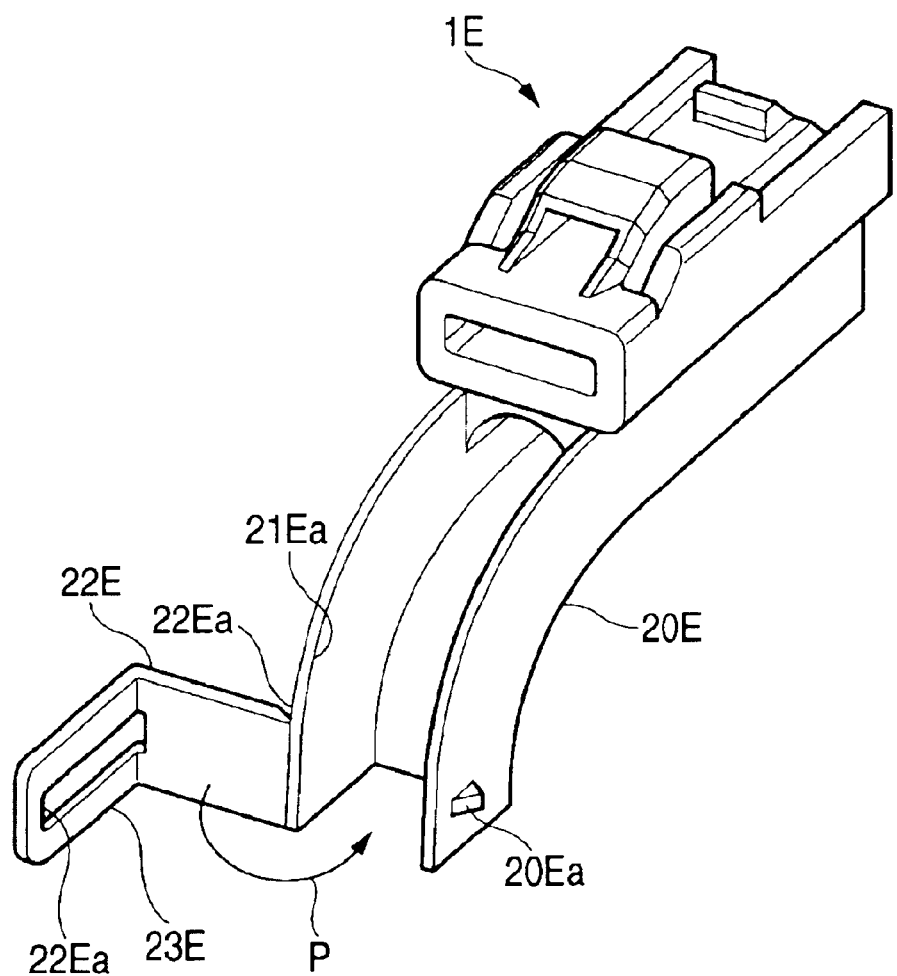
FIG. 10 is a perspective view showing a modified optical connector (modified example 4).

FIG. 10 shows a modified optical connector 1E (modified example 4) in which an outer peripheral side of a bending guide portion 20E has an open portion 21E*a* which is open on a line of extension of the direction of inserting of the optical fiber cord 50 in a housing body portion 10, and an openable closure member 22E for opening and closing that portion of the outer peripheral-side opening, disposed at a distal end portion of the bending guide portion 20E, is mounted on the distal end portion of the bending guide portion 20E through a hinge portion 22E*a*.

Namely, the openable closure member 22E is mounted through the hinge portion 22E*a* on an edge of one side wall of the bending guide portion 20E (defining one side edge of the outer peripheral-side opening) at the distal end portion of the bending guide portion 20E. Here, the hinge portion 22E*a* is formed integrally with the bending guide portion 20E, and that portion, interconnecting the two, is made smaller in thickness than the remainder to form the hinge portion 22E*a*.

The openable closure member 22E can be pivotally moved about the hinge portion 22E*a* between an open position (shown in FIG. 10) where it opens that portion of the outer peripheral-side opening, disposed at the distal end portion of the bending guide portion 20E, and a closed position (into which the openable closure member is moved in a direction of arrow P from the position of FIG. 10) where it closes this portion of the outer peripheral-side opening.

The openable closure member 22E can be brought into and out of engagement with the other side wall of the bending guide portion 20E (which defines the other side edge of the outer peripheral-side opening) at the distal end portion thereof. An engagement piece portion 23E is formed at a distal end of the openable closure member 22E, and when the openable closure member 22E closes the outer peripheral-side opening, this engagement piece portion 23E is disposed in contiguous relation to the outer surface of the other side wall of the bending guide portion 20E (defining the other side edge of the outer peripheral-side opening) at the distal end portion of the bending guide portion 20E. An engagement projection 20E*a* is formed on the other sidewall of the bending guide portion 20E (defining the other side edge of the outer peripheral-side opening) at the distal end portion thereof, and an engagement groove 23E*a*, in which the engagement projection 20E*a* can be engaged, is formed in the engagement piece portion 23E.

When the openable closure member 22E is pivotally moved into the closed position, the engagement projection 20E*a* is engaged in the engagement groove 23E*a* in the engagement piece portion 23E.

In this optical connector 1E, the optical fiber cord 50 can be received in the bending guide portion 22E in the open condition of the openable closure member 22E, and therefore the operation for inserting and holding the optical fiber cord 50 can be effected easily. Then, when the openable closure member 22E is closed, the engagement projection 20E*a* is engaged in the engagement groove 23E*a* in the engagement piece portion 23E, so that the optical fiber cord 50 is held in the bending guide portion 20E, and therefore the optical fiber cord 50 is prevented from being disengaged from the bending guide portion 20E.

As described above, according to the invention, the housing body portion and the bending guide portion are formed integrally with each other, and therefore the two are prevented from being disengaged from each other, and therefore the optical fiber cord is more positively prevented from being abruptly bent. And besides, at least part of the bending guide portion except the inner peripheral side-bending limitation portion is open, and therefore the operation for inserting the optical fiber cord can be easily effected, utilizing this open portion.

Since the housing body portion and the bending guide portion are formed integrally with each other, the operation for combining them together is not necessary, and therefore the assembling efficiency is excellent.

According to the invention, the outer peripheral side of the bending guide portion is open at least on the line of extension of the direction of inserting of the optical fiber cord in the housing body portion, and therefore the operation for inserting the optical fiber cord into the housing body portion can be effected smoothly.

According to the invention, the bending guide portion is open on the line of extension of the direction of inserting of the optical fiber cord in the housing body portion, and therefore the operation for inserting the optical fiber cord into the housing body portion can be effected easily.

The outer peripheral side of the bending guide portion is closed at the distal end portion thereof, and therefore by inserting the optical fiber cord through the distal end portion of the bending guide portion, the optical fiber cord is prevented from being disengaged from the bending guide portion.

According to the invention, the disengagement of the optical fiber cord from the bending guide portion is prevented by the holder member.

What is claimed is:

1. An optical connector comprising:
    a housing body portion for receiving and holding an end portion of an optical fiber cord, the housing body portion being adapted to be connected to a mating optical connector; and
    a bending guide portion of a generally arcuate shape, being formed integrally with the housing body portion and capable of receiving the optical fiber cord;
    wherein
    the bending guide portion has an inner peripheral bending limitation portion for contacting an inner peripheral portion of the optical fiber cord in a bent condition to limit a minimum value of a bend radius of the optical fiber cord; and
    at least a part of the bending guide portion except the inner peripheral bending limitation portion is open.

2. The optical connector according to claim 1, wherein an outer peripheral side of the bending guide portion is open at least on a line of extension of a direction of inserting of the optical fiber cord in the housing body portion.

3. The optical connector according to claim 1, wherein an outer peripheral side of the bending guide portion is open on a line of extension of a direction of inserting of the optical fiber cord in the housing body portion; and
    the outer peripheral side is closed at a distal end portion of the bending guide portion.

4. The optical connector according to claim 1, further comprising:
    a holder member for holding the optical fiber cord in the bending guide portion, mounted at a distal end portion of the bending guide portion;
    wherein
    at least one of the outer peripheral side, one side and the other side of the bending guide portion is open over an entire length thereof in a peripheral direction thereof.

5. An optical connector comprising:
    a housing body portion having a cord insertion hole for receiving and holding an end portion of an optical fiber cord and a stopper inserted in the cord insertion hole for positioning and holding the optical fiber cord, the housing body portion being adapted to be connected to a mating optical connector; and a bending guide portion of a generally arcuate shape, being formed integrally with the housing body portion and capable of receiving the optical fiber cord;

wherein the bending guide portion has an inner peripheral bending limitation portion for contacting an inner peripheral portion of the optical fiber cord in a bent condition to limit a minimum value of a bend radius of the optical fiber cord; and at least a part of the bending guide portion except the inner peripheral bending limitation portion is open.

6. The optical connector according to claim 5, wherein an outer peripheral side of the bending guide portion is open at least on a line of extension of a direction of inserting of the optical fiber cord in the housing body portion.

7. The optical connector according to claim 5, wherein an outer peripheral side of the bending guide portion is open on a line of extension of a direction of inserting of the optical fiber cord in the housing body portion; and the outer peripheral side is closed at a distal end portion of the bending guide portion.

8. The optical connector according to claim 5, further comprising:

a holder member for holding the optical fiber cord in the bending guide portion, mounted at a distal end portion of the bending guide portion;

wherein at least one of the outer peripheral side, one side and the other side of the bending guide portion is open over an entire length thereof in a peripheral direction thereof.

9. The optical connector according to claim 5, wherein the stopper has a positioning tooth for biting engagement with a sheath of the optical fiber cord.

10. An optical connector with integrally formed bending guide portion, the optical connector comprising:

a housing body portion having a cord insertion hole for receiving and holding an end portion of an optical fiber cord, and an opening formed on a bottom portion of the housing body portion, the housing body portion being adapted to be connected to a mating optical connector;

a stopper inserted in the opening for coupling the optical cord to the housing body portion; and a bending guide portion of a generally arcuate shape, being formed integrally with the housing body portion and capable of receiving the optical fiber cord;

wherein the bending guide portion has an inner peripheral bending limitation portion for contacting an inner peripheral portion of the optical fiber cord in a bent condition to limit a minimum value of a bend radius of the optical fiber cord; and at least a part of the bending guide portion is open.

11. The optical connector according to claim 10, wherein an outer peripheral side of the bending guide portion is open at least on a line of extension of a direction of inserting of the optical fiber cord in the housing body portion.

12. The optical connector according to claim 10, wherein an outer peripheral side of the bending guide portion is open on a line of extension of a direction of inserting of the optical fiber cord in the housing body portion; and the outer peripheral side is closed at a distal end portion of the bending guide portion.

13. The optical connector according to claim 10, further comprising:

a holder member for holding the optical fiber cord in the bending guide portion, mounted at a distal end portion of the bending guide portion;

wherein at least one of the outer peripheral side, one side and the other side of the bending guide portion is open over an entire length thereof in a peripheral direction thereof.

14. The optical connector according to claim 10, wherein the stopper has a positioning tooth for biting engagement with a sheath of the optical fiber cord.

* * * * *